United States Patent [19]

Sommi et al.

[11] Patent Number: 5,004,621

[45] Date of Patent: Apr. 2, 1991

[54] METHOD OF PROCESSING A FOOD PRODUCT HAVING A LIQUID CONTENT

[75] Inventors: Franco Sommi; Pier L. Arelli, both of Parma, Italy

[73] Assignee: Manzini, S.p.A, Parma, Italy

[21] Appl. No.: 329,976

[22] Filed: Mar. 29, 1989

[30] Foreign Application Priority Data

Feb. 3, 1989 [IT] Italy .............................. 19311 A/89

[51] Int. Cl.$^5$ ................................................ A23F 3/00
[52] U.S. Cl. ..................................... 426/386; 426/387
[58] Field of Search ................................ 426/386, 387

[56] References Cited

U.S. PATENT DOCUMENTS

| | | | |
|---|---|---|---|
| 2,641,550 | 6/1953 | Dykstra et al. | 426/386 |
| 4,265,920 | 5/1981 | Thijssen | 426/387 |
| 4,806,379 | 2/1989 | Goers et al. | 426/386 |

OTHER PUBLICATIONS

Nelson, P., et al., Fruit and Vegetable Juice Processing Technology, 3rd Ed., 1980, Avi Publishing, Westport, Conn., p. 556.

Primary Examiner—Donald E. Czaja
Assistant Examiner—Helen Pratt
Attorney, Agent, or Firm—Hedman, Gibson, Costigan & Hoare

[57] ABSTRACT

A method and a relevant facility for the treatment of an alimentary product with a liquid content calls for a step in which this whole alimentary product is disintegrated and in which the disintegrated alimentary product is for the first time at such a temperature as to undergo an evaporation, and calls for subsequent steps of processing of the disintegrated alimentary product; the evaporate resulting from the evaporation is condensed and collected, with the flavoring substances contained in the evaporate being recovered.

13 Claims, 1 Drawing Sheet

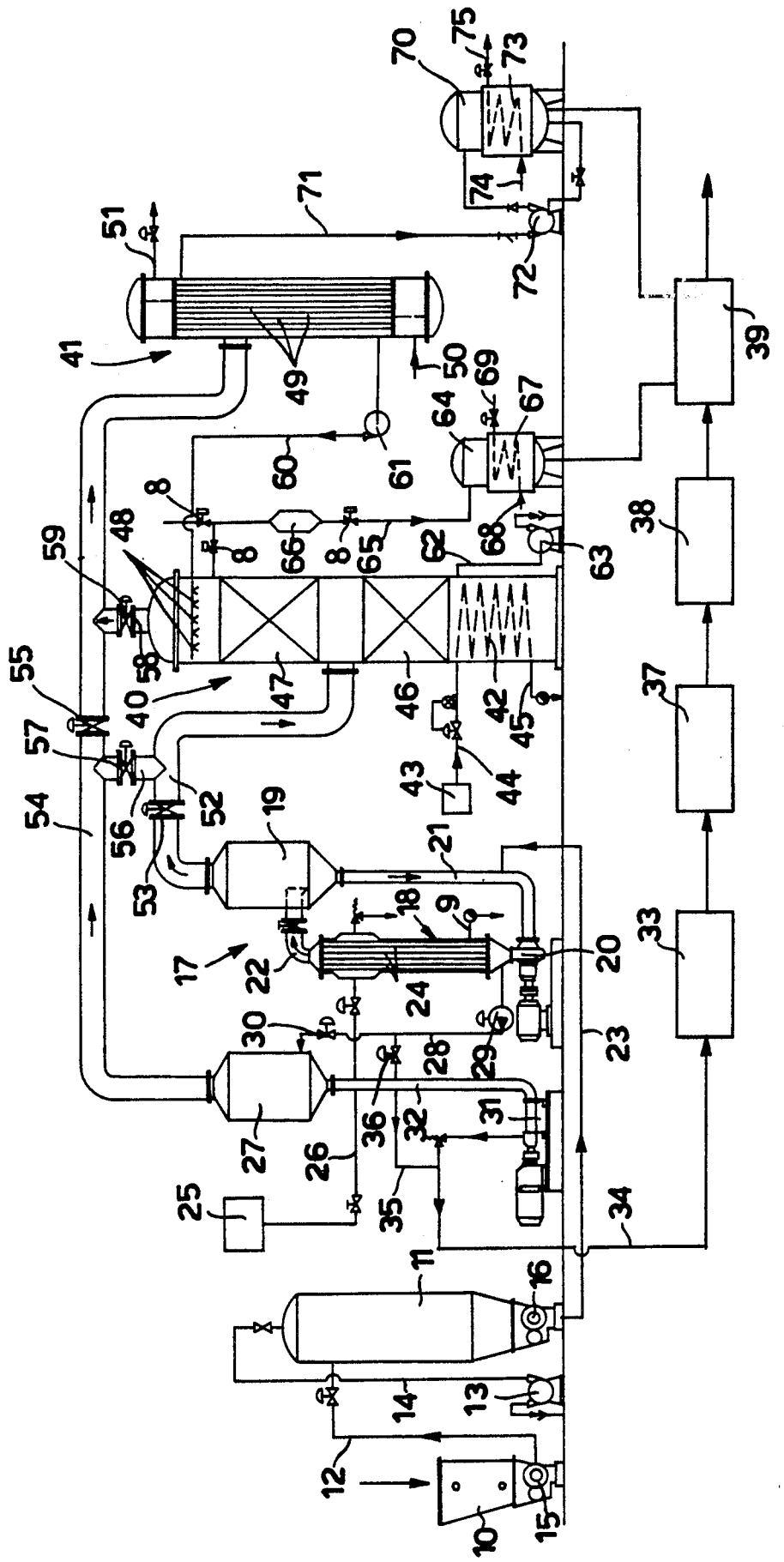

METHOD OF PROCESSING A FOOD PRODUCT HAVING A LIQUID CONTENT

The object of the present invention is a method and a relevant facility for the processing of an alimentary product with a liquid content.

Treatment routes for processing alimentary products having liquid content, e.g., vegetable products (fruit, vegetables, and so forth), in which the alimentary product is ground and is submitted to heating in one or more step(s), with partial evaporation of the product are known in the art.

For example, in processing whole tomatoes to obtain tomato concentrate, tomatoes, after being washed and sorted, are ground and pre-heated. After the grinding process, the pre-heated tomato seeds and peels are removed, and then submitted to a series of heating steps with evaporation. This caused it to be concentrated, and it is then sent for pasteurization and packaging.

Unfortunately, the heating step, or the series of heating steps of the alimentary product cause a depletion of the flavouring substances contained in the product. Therefore, the final alimentary product loses most of its content of flavouring substances, and consequently one of its most important characteristics its taste.

It would therefore be desirable that these flavouring substances which were unavoidably lost or damaged during the transformation process was preserved.

It is furthermore desirable that such a preservation be achieved at an optimum level.

The purpose the present invention is of to fulfill the above said requirements.

This purpose is achieved by means of a method for having processing an alimentary product a liquid content. It comprises a step in which the entire product is disintegrated. The the disintegrated product is brought to a temperature at which evaporation occurs. It comprises successive steps of processing of the disintegrated alimentary product. This includes condensing and recovering the evaporate resulting from the above-said evaporation with the flavouring substances contained in said evaporate being recovered.

In the following, an example a practical embodiment of a facility for carrying out the method according to the present invention is disclosed by referring to the hereto attached single drawing table which shows a general schematic view of said facility.

The facility shown as a practical embodiment, is for, but not limited to, tomato processing.

The facility is provided with a feeding section, which comprises a hopper 10 and a deaerator 11 connected through a duct 12. The deaerator 11 is connected with a vacuum pump 13 through a duct 14. At the outlet ends of the hopper 10 and of the deaerator 11, two respective axial pumps 15 and 16 are installed.

The facility is then provided with a heating/preconcentration section comprising an evaporation unit 17. The evaporation unit 17 comprises a heat exchanger 18 of tube-bundle type, and a vapour separator 19 (which substantially is a vessel inside which the separation of the liquid phase from the vapour phase takes place). The bottom side of the heat exchanger 18 is connected with the delivery end of recycle means, such as a centrifugal pump 20, the intake end of which is connected with a duct 21 which puts the pump 20 in communication with the bottom side of the vapour separator 19. A duct 22 puts then the top side of the heat exchanger 18 in communication with the vapour separator 19. The duct 21 communicates with the delivery end of the pump 16 through a duct 23. The heat exchanger 18 comprises in its interior a tube bundle 24; inside said tubes tomato flows. The interior of said tubes is connected at an end with the delivery end of the pump 20, and at its other end with the duct 22.

The external side of the tubes of the tube bundle is destined to be lapped by steam coming from an external steam source schematically respresented by a block 25, connected with the heat exchanger 18 thrugh a duct 26; by means of the reference numeral 9, the drain for the condensate steam from the heat exchanger 18 is represented.

Besides the evaporation unit 17, this heating/preconcentration section of the facility comprises a further vapour separator 27, which is connected with the bottom side of the heat exchanger 18, in communication with the interior of the tubes 24, through a duct 28; on such a duct 28, an extraction pump 29 is installed in the nearby of the heat exchanger 18, and furthermore a valve 30 is installed downstream the pump 29. The bottom side of the vapour separator 27 is connected with the intake end of an axial pump 31 by means of a duct 32.

The delivery side of the pump 31 is connected with a refining section schematically shown as a block 33, through a duct 34. From the duct 28, a duct 35 branches off, which is directly connected with the refining section 33 by means of the duct 34; on the duct 35, a valve 36 is installed.

The outlet end of the refining section 33 is in its turn connected with a concentration section of known type, schematically represented as a block 37.

The outlet end of the concentration section 37 is in its turn connected with a pasteurization section of known type, schematically represented as a block 38.

Finally, the outlet end of the pasteurization section 38 is connected with a packaging section 39.

Besides the hereinabove disclosed equipment pieces, the facility is furthermore equipped with a section of recovery of the flavouring substances contained in tomato.

This recovery section comprises a tray-type distillation tower 40, and a surface condeser 41.

The distillation tower 40 is equipped in its interior, in its bottom portion, with a coil 42 inside which steam is circulated, which comes from an external steam source schematically represented by means of a block 43 and connected with the coil 42 by means of a duct 44; the reference numeral 45 indicates the drain for the condensate deriving from the condensation of steam inside the coil 42. Above the coil 42, a first set of transversal trays of known type are installed; said first set of trays are schematically indicated by the block 46. Above the first set of trays 46, a second set of transversal trays of known type are installed; said first set of trays are schematically indicated by the block 47.

Above said second set of transversal trays 47, at the top of the distillation tower 40, distributor nozzles 48 are installed.

The condenser 41 is equipped with an internal tube bundle 49. Inside the tubes of said tube bundle a refrigerating liquid flows. By means of the reference numerals 50 and 51, the inlet of the refrigerating liquid to the condenser 41 and the outlet of the refrigerating liquid from the condenser 41 are respectively indicated.

The interior of the distillation tower 40 and the interior of the condenser 41 are in communication with the interior of the vapour separators 19 and 27 through purposely provided pipes. In particular, a pipe 52 is provided, on which a valve 53 is installed, and which puts the interior of the vapour separator 19 in communication with the interior of the distillation tower 40, at a point between the first set of trays 46 and the second set of trays 47. A pipe 54, on which the valve 55 is installed, puts the interior of the vapour separator 27 in communication with the external side of the tube bundle 49 of the condenser 41; a pipe 56, on which the valve 57 is installed, puts the pipes 52 and 54 in communication with each other.

The interior of the distillation tower 40 and of the condenser 41 are in communication with each other. In particular, the head of the distillation tower 40 is in communication with the external side of the tube bundle 49 of the condenser 41 by means of a pipe 58 on which the valve 59 is installed, and of the pipe 54. The bottom portion of the external side of the tube bundle 49 is on the contrary in communication with the distributor nozzles 48 by means of a duct 60 on which a centrifugal pump 61 is installed.

The bottom portion of the interior of the distillation tower 40 is connected to an extraction pump 63 means of a duct 62.

The top portion of the interior of the distillation tower 40 is connected with the interior of a collection vessel 64 by means of a duct 65 on which an intermediate collection vessel 66 is installed. Inside the vessel 64 a coil 67 is installed, inside which a refrigerating liquid is circulated; by means of the reference numerals 68 and 69, the inlet for the refrigerating liquid fed to the coil 67 inside the vessel 64, and the outlet for the above said refrigerating liquid from the vessel 64 are respectively indicated.

The external side of the tube bundle 49 of the condenser 41 is in communication with the interior of a collection vessel 70 by means of a duct 71 branching from the condenser 41. On the duct 71 a vacuum pump 72 is installed. Inside the vessel 70 a coil 73 is installed, inside which a refrigerating liquid is circulated; by means of the reference numerals 74 and 75, the inlet for the refrigerating liquid fed to the coil 73 inside the vessels 70, and the outlet for the above said refrigerating liquid from the vessel 70 are respectively indicated.

The processing of tomato using the above disclosed and illustrated facility takes place as follows.

Tomatoes submitted for and processing some from a sorting plane which is not shown in the drawing. They are collected inside the hopper 10 and are sent by the pump 15 through the duct 12 into the deaerator 11. Inside said deaerator 11, tomatoes are deaerated by the vacuum pump 13 are therefore exposed to a vacuum at room temperature. From the deaerator 11, tomato product is sent by the pump 16 through the duct 23 to the duct 21 of the evaporation unit 17.

Once is made it has entered the duct 21, tomato is made product circulates in a closed loop by the pump 20, in the direction shown by the arrows, in the following path; through the duct 21, into the inner side of the tube bundle 24 of the heat exchanger 18, inside the duct 22, and inside the vapour separator 19. The external side of the tube bundle 24 is lapped by the steam coming from the kettle 25 through the duct 26. During this processing step, tomatoes undergo a true grinding by the pump 20 and are furthermore heated inside the heat exchanger 18 to such a high temperature that they subsequently evaporate inside the vapour separator 19. A portion of the tomato circulating inside said closed loop is intaken by the pump 29, and is sent through the duct 28, to the vapour separator 27. Inside this vapor separator, the product cools, with a further evaporation of tomato being obtained. From vapour separator 27, tomato is sent by the pump 31, through the duct 34, to the refining section 33.

In the product refining section 33, the seeds and the peels are removed from the so semi-finished tomato are removed.

From the product refining section 33, the so-refined tomato is sent to the concentration section 37, in which said tomato undergoes a further evaporation and therefore loses most of its liquid content, thus reaching a high concentration level.

From the concentration section 37, the so-concentrated tomato is then sent to the pasteurization section 38, in which it is sterilized by means of a high-temperature treatment.

The so sterilized tomato concentrate is then sent to the packaging section, in which it is packed inside suitable containers.

The content of flavouring substances of tomato, most of which would be lost during the above disclosed processing steps, is recovered as follows.

The evaporate of tomato is formed in the vapour separator and is conveyed through the pipe 52 into the distillation tower 40. The evaporate of tomato which is formed in the vapour separator 27 is conveyed into the condenser 41 through the pipe 54, by closing the valve 57 and opening the valve 55, or, alternatively, is conveyed into the distillation tower 40 through the pipes 54, 56, 52, and closing the valve 55 and opening the valve 57. The selection between either of said directions of conveyance can be made as a function of the parameters of the facility, and as a function of an optimization of the recovery of tomato's flavouring substances.

These flavoring substances are the aromatic substances contained in the treated vegetable product. These substances are generally aldehydes and alcohols which differ in different products.

Inside the distillation tower 40, a continuous fractional distillation with rectification is carried out. Substantially, through the distillation tower 40 a rising stream of tomato evaporate and a downwards stream of tomato concentrate flow. In particular, tomato evaporate which reaches the head of the distillation tower 40 flows through the pipes 58 and 54, to the condenser 41, inside of which it condenses due to the heat exchange with the refrigerating liquid flowing inside the tube bundle 49.

The pump 61 sends the condensate to the head of the distillation tower 40, where it is evenly distributed by the distributor nozzles 48. During the upwards movement of tomato evaporate and the simultaneous downwards motion of tomato condensate, the less volatile fractions of the evaporate condense and by means of their condensation heat, cause the most volatile fractions to evaporate from the condensate; as a consequence, the rising evaporate gets more and more enriched in more volatile components, whilst the downwards flowing condensate gets more and more enriched in less volatile components. The transversal trays 46 and 47 enable, according to a known technique, a better contact to take place between the evaporate and the condensate, rendering their mutual interaction more complete. A portion of the condensate falling down to the bottom end of the distillation tower 40 evaporates again owing to the heat exchange thereof with steam flowing inside the interior of the coil 42; the remainder portion of the condensate, by now deprived of the flavouring substances, is discharged to the outside through the duct 62 by means of the extraction pump 63.

From the top side of the distillation tower 40, the condensate rich in the more volatile components is drawn off through the duct 65. The drawn off condensate is first collected inside the intermediate vessel 66 and then, when it reaches a certain level inside said vessel, is sent to the collection vessel 64 in which is is further cooled by heat exchange with the refrigerating liquid flowing inside the coil 67. These operations are controlled by means of valve 8; the intermediate collection tank 66 allows the amount of drawn off condensate to be controlled. The drawing off of the enriched condensate can be carried out at other points of the distillation tower 40, by means of other drawing-off ducts connected with the collection vessel 64.

A portion of the evaporate, containing very highly volatile components, not condensible inside the condenser 41 is intaken by the vacuum pump 72 through the duct 71 and is sent to the collection vessel 70, inside which the pressure is kept at the atmospheric level. The increase in pressure due to the passage through the pump 72, leads to the condensation of said portion of the evaporate at the delivery side of the same pump. The heat generated due to the effect of this condensation is removed by means of the refrigerating liquid which circulates inside the coil 73. It should be observed in this regard that inside the condenser 41 a pressure exists, which is much lower than the atmospheric pressure. This low pressure is generated by the vacuum pump 72, which prevents the above said portion of the evaporate from condensing; this is due to the need for having a pressure much lower than the atmospheric pressure inside the vapour separators 19 and 27, communicating with the condenser 41, so as to allow the ground tomato to evaporate at a low temperature. In this way thermal energy is saved, and tomato product is prevented from undergoing deterioration caused by the action of heat.

Inside the vessels 64 and 70, the condensate of the more volatile components of the evaporate coming from the vapour separators 19 and 27 is collected. Such a condensate results to contain the flavouring substances of tomato, and therefore, summing-up, the content of flavouring substances is recovered inside the vessels 64 and 70 as a liquid rich in flavouring substances.

Such a liquid rich in flavouring substances can be then sent to the packaging section 39, as shown in the figure, in order to be fed into the suitable containers together with the tomato concentrate, and give the end product its proper flavour. Or, the liquid rich in flavouring substances can be packed inside containers of its own, in order to be mixed, e.g., at a later time, with processed tomato. Such a processed tomato can be the outcome of the hereinabove processing method, or of other processing routes. It can also be besides straight tomato concentrate, tomato sauce or tomato juice.

For the sake of simplicity, one may also choose not to recover flavour-rich condensates which come from very volatile components not condensible inside the condenser 41. This obviously causes a decrease in recovery yield.

In the tomato processing discussed hereinabove, both vapour separators 19 and 27 are used. This is the processing method known from the prior art and as the "HOT BREAK" route. However, a recovery of the flavouring substances contained in tomato can be obtained also using only one vapour separator 19 i.e., the processing method known as the "COLD BREAK" process.

In this latter case, the valves 30, 55, 57 are closed and the valve 36 is opened. (In the processing by means of the "HOT BREAK" on the contrary) the valve 36 is closed, the valve 30 is opened, and either of the valves 55, 57 is opened and the other one is closed. This is according to whether the evaporate coming from the vapour separator 27 is conveyed to the distillation tower 40, or to the condenser 41.) This causes the tomato extracted from the pump 29 to go directly to the refining section 33 through the ducts 35 and 34 and the step is therefore skidded of tomato cooling and evaporation inside the vapour separator 27.

Anyway, the evaporate which is produced inside the vapour separator 19 is still conveyed to the distillation tower 40 through the pipe 52, and the above seen continuous fractional distillation takes place, with the flavouring substances contained in tomato being recovered.

The method for the recovery of the content of flavouring substances of tomato shows to be particularly efficacious and makes possible a liquid to be obtained having a high content of flavouring substances. This is due to the condensation and to the enrichment of the condensate in more volatile components.

Obviously, such a result can be obtained in a way different to as hereinabove described and illustrated. For example, one might fractionally condense the evaporate generated by the vapour separators in successive condensation steps of this method the less volatile components are condensed first, and the more volatile components are subsequently condensed up to the last condensation step, in which the most volatile components absolutely are condensed.

Obviously, both in case of fractional distillation, and in case of fractional condensation, the equipment pieces used are those which are regarded as the most suitable ones for the intended purpose (condensers, distillation towers, and so forth). Not necessarily should the fractional distillation be a rectification as in the example.

According to very simple form of practical embodiment, one could simply condense the evaporate of the tomato with a condensate being obtained which contains flavouring substances, although in a more diluted form than obtained by means of the above disclosed methodology.

Operating on the evaporate which results from the first heating step of the ground tomato makes possible the recovery of nearly all of the content flavouring substances. These normally get lost or damaged during the tomato according to processing as described in the prior art, as discussed in the introduction.

By means of the herein disclosed method and facility, not only tomatoes, but in addition other alimentary products having a liquid content can be processed, such as, e.g., fruit, with the contents of flavouring substances being always efficaciously recovered according to as hereinabove seen.

This method for the recovery of the content of the flavouring substances of other alimentary products can be applied both in cases of treatment of the alimentary product to obtain a concentrate of the same product at a more or less high concentration level, or when the alimentary product, after being refined, is not concentrated but is directly sent to the packaging step. In this latter case, the product obtained is not concentrated, or, in case of tomato is tomato juice, and in case of fruit is fruit puree. Also in this latter case, the content of flavouring substances of the alimentary product is removed upstream of the refining section.

In general, this method for the recovery of the flavouring substances is applicable to any types of alimentary products having a liquid content which, during the processing, turns from a whole status to a successive disintegrated status, and at such a temperature as to evaporate. In this way the evaporate is condensed and collected, to recover the flavouring substances given off by the disintegrated product and evaporated. The condensate is preferably enriched in its more volatile components, and in this way a condensate is obtained, which is very rich in flavouring substances of the product. The alimentary product can be disintegrated and substantially heated at the same time, as in the preceding example, or it can be either first disintegrated and then heated; or first heated and then disintegrated. The efficacy of the recovery can be increased by the way of proceeding consisting in disintegrating and heating the product substantially simultaneously, so as not to lose the flavouring substances which are emitted during the disintegration before the heating.

Of course, there are various means for practicing this recovery method, as well as various means for disintegrating and heating the whole product. For example, for the condensation and the enrichment steps, as above said, apparatuses can be used, which are normally used for such techniques in other fields. Hence, the distillation tower and the condenser, as well as the means for collecting the flavouring condensates as herein disclosed and illustrated are not binding, even if they show to be very efficacious. The heating means for the heating of the alimentary product can be simple, and not of the recycle type, or they can be of a type different from the tube-bundle type, different from that shown in the preceding example, and furthermore a single vapour separator can also be provided for.

In general, the means of disintegration, the means for product transfer and the cycle of product transfer downstream the disintegration and evaporation steps can be different from that disclosed in the illustrative example.

We claim:

1. A method for processing a food product having a liquid, comprising:
   (a) deaerating the food product;
   (b) disintegrating said deaerated food product;
   (c) heating said disintegrated food product to a temperature for forming an evaporate containing flavor substances;
   (d) condensing and collecting said evaporate of the food product to thereby form a condensate; and
   (e) recovering said flavor substances from said evaporate; wherein the above steps (a) through (e) are substantially immediately after one another.

2. The method of claim 1, further comprising increasing the proportion of said flavor substances in said condensate.

3. The method of claim 2, further comprising fractionally distilling said condensate to thereby increase the proportion of said flavor substances.

4. The method of claim 2, further comprising fractionally condensing said condensate to thereby increase the proportion of said flavor substances.

5. The method of claim 3, wherein said fractional distillation is carried out continuously.

6. The method of claims 3 or 4 wherein said fractional distillation includes rectification.

7. The method of claims 1 or 2 wherein the step of condensing and collecting the evaporate comprises condensing the evaporate at less than atmospheric pressure to thereby form a condensed portion and an uncondensed portion, and condensing said uncondensed portion at or above atmospheric pressure.

8. The method of claims 1 or 2 further comprising collecting the condensate, said condensate containing flavor substances, and mixing said collected condensate containing said flavor substances with the food product at the end of step (e).

9. The method of claim 1, wherein steps (b) and (c) are conducted substantially concurrently to thereby produce a first evaporate.

10. The method of claim 9 further comprising producing a second evaporate after said first evaporate and producing said evaporate from said first and second evaporate.

11. The method of claims 9 or 1 wherein said heating step is carried out by forced circulation.

12. The method of claim 1 wherein the food product has peels and seeds further comprising a step of removing peels and seeds from the product of step (c).

13. The method of claim 12 further comprising concentrating the product obtained from said peels and seeds removal step.

* * * * *